3,185,691
CYCLOOCTENO-PYRIMIDINES
Edward Joseph Pribyl, Metuchen, and Chester Frank Turk, Elizabeth, N.J., assignors to Olin Mathieson Chemical Corporation, New York, N.Y., a corporation of Virginia
No Drawing. Filed Sept. 14, 1962, Ser. No. 224,281
8 Claims. (Cl. 260—256.4)

This invention relates to cycloocteno-pyrimidine derivatives. More particularly, the invention relates to cycloocteno-pyrimidines of the formula (I)

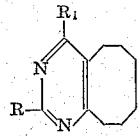

and to acid addition salts thereof.

$R_1$ in Formula I represents amino, hydroxy, thiol, halogen, lower alkoxy or a basic group of the following structure:

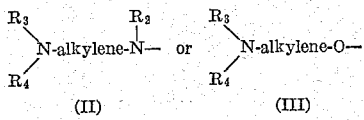

(II)            (III)

R represents the same as $R_1$ and hydrogen in addition.

$R_2$ represents hydrogen or lower alkyl of which the former is preferred. $R_3$ and $R_4$, which may be the same or different, each represents hydrogen, lower alkyl, hydroxy-lower alkyl or phenyl-lower alkyl. In addition, the nitrogen may join with the groups represented by $R_3$ and $R_4$ to form a 5 to 7 membered monocyclic heterocyclic containing, if desired, an oxygen, sulfur or an additional nitrogen atom. That is, the two symbols $R_3$ and $R_4$ together represent a tetramethylene, pentamethylene, hexamethylene, oxapentamethylene, oxatetramethylene, azahexamethylene, azatetramethylene, azapentamethylene, thiapentamethylene or thiatetramethylene group whose terminal bonds couple with the nitrogen in a ring structure. The heterocyclic group may also be substituted by one or two lower alkyl, halogen or nitro substituents.

Representative substituents symbolized by R and $R_1$ include the following: the halogens chlorine, bromine, iodine and fluorine, of which chlorine and bromine are preferred, lower alkoxy groups such as methoxy, ethoxy, propoxy, isopropoxy, butoxy and the like. The alkyl groups included in the symbols $R_2$ and $R_3$ and $R_4$ are straight or branched chain saturated aliphatic groups containing up to about 12 carbons. Lower alkyl groups such as methyl, ethyl, propyl, isopropyl, butyl, t-butyl, amyl and the like, are, however, preferred. The alkylene chains in the basic substituents are straight or branched chain saturated aliphatic groups of the same character of which lower alkylene is also preferred.

The basic, nitrogen containing radical (IV) 

which forms part of groups II and III above includes, for example, lower alkylamino e.g. methylamino, ethylamino, di(lower alkyl) amino, e.g. dimethylamino, diethylamino, dipropylamino, (hydroxy-lower alkyl)amino, e.g. hydroxyethylamino, di(hydroxy-lower alkyl)amino, e.g. di(hydroxyethyl)amino, phenyl(lower alkyl)amino, e.g. benzylamino, phenethylamino, N-(lower alkyl)-phenyl(lower alkyl)amino, e.g. N-methylbenzylamino, and the like. Di-lower alkylamino groups are preferred.

Heterocyclic groups represented by the radical IV include for example, piperidino, (lower alkyl)piperidino, e.g. methylpiperidino, di(lower alkyl)piperidino, e.g. dimethylpiperidino, (lower alkoxy)piperidino, e.g. methoxypiperidino, 2-, 3- or 4-piperidyl, 2-, 3- or 4-(N-lower alkylpiperidyl), e.g. 2-, 3- or 4-(N-methylpiperidyl), pyrrolidino, (lower alkyl)pyrrolidino, e.g. methylpyrrolidino, di(lower alkyl)pyrrolidino, e.g. dimethylpyrrolidino, (lower alkoxy)pyrrolidino, e.g. ethoxypyrrolidino, 2- or 3-pyrrolidyl, 2- or 3-(N-lower alkylpyrrolidyl), e.g. 2- or 3-(N-methylpyrrolidyl), morpholino, (lower alkyl)morpholino, e.g. N-methylmorpholino or 2-methylmorpholino, di(lower alkyl)morpholino, e.g. 2,3-dimethylmorpholino, (lower alkoxy)morpholino, e.g. ethoxymorpholino, thiamorpholino, (lower alkyl)thiamorpholino, e.g. N-methylthiamorpholino or 2-methylthiamorpholino, di(lower alkyl)thiamorpholino, e.g. 2,3-dimethylthiamorpholino, (lower alkoxy)thiamorpholino, e.g. 2-methoxythiamorpholino, piperazino, (lower alkyl)piperazino, e.g. $N^1$-methylpiperazino, 2-methylpiperazino, 2-methylpiperazino or $N^1$-methylpiperazino, di(lower alkyl)piperazino, e.g. 2,3-dimethylpiperazino, hexamethyleneimino and homopiperazino. Nitrogen heterocyclics are preferred.

A few illustrations of the complete groups II and III are thus dimethylaminomethylamino, dimethylaminopropylamino, diethylaminoethylamino, diethylaminoethoxy, dimethylaminomethoxy, dipropylaminoethoxy, N-methyl-diethylamino, N-methyl-dimethylamino, piperidinopropylamino, piperidinoethylamino, morpholinopropylamino, pyrrolidinopropoxy, homopiperazinomethylamino, and the like.

The bases of Formula I form acid addition salts with the common inorganic and organic acids. Such inorganic salts as the hydrohalides, e.g. hydrobromide, hydrochloride, hydroiodide, sulfates, nitrates, phosphates, borates, etc., and organic salts as acetate, oxalate, tartrate, malate, citrate, succinate, benzoate, ascorbate, salicylate, theophyllinate, camphorsulfonate, alkanesulfonate, e.g. methanesulfonate, benzenesulfonate, toluenesulfonate and the like are within the scope of the invention. Formation of the acid salt frequently provides a convenient means for readily isolating and obtaining pure product. The free base may then be obtained by neutralization, e.g. with sodium hydroxide.

The compounds of this invention are produced by initially reacting a 2-ketocyclooctylcarboxylate, e.g. a lower alkyl ester such as ethyl 2-ketocyclooctylcarboxylate, with either guanidine, thiourea or urea. This reaction, carried out in a solvent such as sodium methylate, preferably with heating, yields a cyclooctenopyrimidine with a hydroxy group in the 4-position and either an amino, thiol or hydroxy group in the 2-position depending on the nitrogen compound used as starting material.

By reacting this cyclooctenopyrimidine with a phosphorus oxyhalide such as phosphorus oxychloride or phosphorus oxybromide, preferably the former, with heating, the hydroxy group in the 4-position is replaced with a halogen. Then any of the groups represented by $R_1$ may be introduced by further reaction with a dialkylaminoalkylamine, piperidinoalkylamine, sodium hydrosulfide, alcoholic ammonia or the alkali metal salts of dialkylaminoalcohols, or morpholinoalkylalcohol and the like.

A similar procedure may be followed with the products containing hydroxy groups in both the 2- and 4-positions (obtained from urea), so that new substituents of the character described may be introduced into both those positions.

In order to introduce the group R into the 2-position, the 2-thiol product derived from thiourea is first alkylated with methyl iodide and sodium hydroxide to obtain the 2-methylthio derivative. Then reaction with a basic compound such as 3-dimethylaminopropylamine at reflux temperature, effects the displacement of the methylthio group with the basic group. If it is then desired to introduce another group $R_1$ in the 4-position, the procedure involving reaction with phosphorus oxychloride, etc., described previously may be followed.

The 2-position may be left unsubstituted, i.e. R in Formula I represents hydrogen, by removing the 2-thiol group with Raney nickel.

The compounds of this invention have a lowering effect on blood pressure and are useful in the treatment of hypertension. They may be administered orally or parenterally in the form of tablets, capsules, elixirs, injectables or the like by incorporating the appropriate dosage of a compound of Formula I or a physiologically acceptable acid addition salt thereof in a conventional vehicle according to accepted pharmaceutical practice.

The following examples are illustrative of the invention.

EXAMPLE 1

*2-amino-5,6,7,8,9,10-hexahydro-4-pentyloxycycloocta[d] pyrimidine*

(a) *2 - amino - 5,6,7,8,9,10-hexahydro-cycloocta[d]pyrimidin-4-ol.*—To a solution of 5.4 g. of sodium methylate in 30 ml. of absolute ethanol is added 9.5 g. of guanidine hydrochloride at 50° C. Twenty grams of ethyl 2-keto cyclooctylcarboxylate is added and the mixture is refluxed for 4 hours. The solid is filtered, suspended in water and refiltered. The crude product is recrystallized twice from 300 ml. of 50% ethanol to give 3.5 g. (17%) of material melting between 298–300° C.

(b) *2 - amino - 4-chloro-5,6,7,8,9,10-hexahydrocycloocta[d]pyrimidine.*—Fourteen and one-half grams of 2-amino - 5,6,7,8,9,10-hexahydrocycloocta[d]pyrimidin-4-ol and 75 ml. of phosphorus oxychloride are mixed and refluxed for one hour. The solution is cooled and poured onto 500 g. of crushed ice. This mixture is neutralized to pH 7 with concentrated ammonium hydroxide. The solid is filtered and dried. Upon recrystallization from 600 ml. of hexane there is obtained 8.5 g. (53%) of material melting between 136–138° C.

(c) *2 - amino - 5,6,7,8,9,10-hexahydro-4-pentyloxycycloocta[d]pyrimidine.*—Six and one-half grams of 2-amino - 4 - chloro-5,6,7,8,9,10-hexahydrocycloocta[d]pyrimidine is added at room temperature to a solution of one gram of sodium dissolved in 100 ml. of amyl alcohol. The mixture is stirred and refluxed for four hours. The sodium chloride is filtered off and the excess amyl alcohol removed in vacuo on the steam bath. The residue is recrystallized from 50 ml. of hexane to give 5.5 g. (69%) of material melting between 100–102° C.

EXAMPLE 2

*2,4-diamino-5,6,7,8,9,10-hexahydrocycloocta[d]pyrimidine, hydrochloride, hydrate*

A mixture of 4.5 g. of 2-amino-4-chloro-5,6,7,8,9,10-hexahydrocycloocta[d]pyrimidine and 50 ml. of 3 N ethanolic ammonia are heated in a sealed tube for 20 hours at 150° C. After cooling, the contents of the tube are transferred to a flask and the mixture evaporated to dryness. The residue is recrystallized from 60 ml. of 95% ethanol to give 2.2 g. (42%) of material melting between 256–258° C.

EXAMPLE 3

*2 - amino-4-(3-dimethylaminopropylamino)-5,6,7,8,9,10-hexahydrocycloocta[d]pyrimidine, salt with two moles of oxalic acid*

Three grams of 2-amino-4-chloro-5,6,7,8,9,10-hexahydrocycloocta[d]pyrimidine and 20 g. of 3-dimethylaminopropylamine are mixed and refluxed for 8 hours. The excess diamine is removed by heating on the steam bath in vacuo. The residue is suspended in water filtered and dried to give 2.5 g. of the base melting between 117–120°. This base is dissolved in 8 ml. of absolute alcohol and added to a solution of 2 g. of oxalic acid in 8 ml. of alcohol. The clear solution is diluted with 2 volumes of anhydrous ether to give 3.7 g. of crude product. This solid is recrystallized from 50 ml. of a methanol-ether mixture to give 3.1 g. (48%) of material melting between 173–175° C.

EXAMPLE 4

*2 - amino - 5,6,7,8,9,10-hexahydro-4-(3-piperidinopropylamino)cycloocta[d]pyrimidine, salt with one and one-half moles of oxalic acid*

Five grams of 2-amino-4-chloro-5,6,7,8,9,10-hexahydrocycloocta[d]pyrimidine and 45 g. of 1-(3-aminopropyl)piperidine are reacted as described in Example 3. The crude product is recrystallized from 200 ml. of a methanol-ether mixture to give 2.9 g. (29%) of material melting between 240–242° C.

EXAMPLE 5

*2 - amino-5,6,7,8,9,10-hexahydro-4-(3-morpholinopropylamino)cycloocta[d]pyrimidine, salt with one and one-half moles of oxalic acid*

Five grams of 2-amino-4-chloro-5,6,7,8,9,10-hexahydrocycloocta[d]pyrimidine and 35 g. of 4-(3-aminopropyl)morpholine are reacted as described in Example 3. The crude product is recrystallized from 50 ml. of an ethanol-ether mixture to give 1.2 g. (11%) of material melting between 170–172° C.

EXAMPLE 6

*2 - amino-4-(3-dimethylaminopropyl)methylamino-5,6,7,8,9,10-hexahydrocycloocta[d]pyrimidine, salt with two moles of oxalic acid*

Six and one-half grams of 2-amino-4-chloro-5,6,7,8,9,10-hexahydrocycloocta[d]pyrimidine and 27 g. of N,N,N'-trimethyl-1,3-propanediamine [J. Amer. Chem. Soc. 77, 3633 (1955)] are reacted as described in Example 3. The crude product is recrystallized from 125 ml. of absolute alcohol to give 10.5 g. (72%) of material melting between 143–145° C.

EXAMPLE 7

*2 - amino-4-(2-diethylaminoethoxy)-5,6,7,8,9,10-hexahydrocycloocta[d]pyrimidine, salt with two moles of oxalic acid, hydrate*

Five and one-half grams of 2-amino-4-chloro-5,6,7,8,9, 10-hexahydrocycloocta[d]pyrimidine is added to a solution of 1 gram of sodium dissolved in 100 ml. of 2-diethylaminoethanol. The mixture is stirred and heated on the steam bath for 3 hours. The sodium chloride is filtered off and the excess basic alcohol is distilled off on the steam bath in vacuo. The residue is suspended in water, filtered and dried. Upon recrystallization from 50 ml. hexane there is obtained 5 g. of base M.P. 84–86°. The base is dissolved in 15 ml. of absolute ethanol and added to a solution of 3.8 g. of oxalic acid in 15 ml. of ethanol. The oxalate is filtered off and recrystallized from 50 ml. of absolute ethanol to give 6.5 g. (51%) of material melting between 128–130° C.

EXAMPLE 8

*2-amino-5,6,7,8,9,10-hexahydrocycloocta[d]pyrimidine-4-thiol*

A mixture of 6.3 g. of 2-amino-4-chloro-5,6,7,8,9,10-hexahydrocycloocta[d]pyrimidine, 15 g. of sodium hydrosulfide and 60 ml. of 95% alcohol is stirred and refluxed for 6 hours. The cooled mixture is poured into ice water and neutralized to pH 5 with acetic acid. The solid is collected, washed with water and dried. The product is recrystallized from 50 ml. of 70% alcohol to give 4.2 g. (68%) of a pale yellow solid melting between 235–237° C.

EXAMPLE 9

*2,4-bis[2-diethylaminoethylamino]-5,6,7,8,9,10-hexahydrocycloocta[d]pyrimidine, salt with three moles of oxalic acid*

(a) *5,6,7,8,9,10 - hexahydrocycloocta[d]pyrimidin - 2,4-diol.*—To a solution of 4.6 g. of sodium in 200 ml. of absolute ethanol is added 24 g. of urea and 40 g. of ethyl-2-keto cyclooctylcarboxylate and the mixture refluxed for 18 hours. About 100 ml. of ethanol is distilled off. The thick residue is cooled and diluted with 300 ml. of water when complete solution occurs. This solution is extracted with 200 ml. of ether. The yellow aqueous layer is acidified to Congo red with dilute hydrochloric acid. The product is collected and recrystallized from 120 ml. of 80% ethanol to give 15.8 g. (40%) of material melting between 267–268° C.

(b) *2,4 - dichloro - 5,6,7,8,9,10-hexahydrocycloocta[d]-pyrimidine.*—Twenty-seven grams of 5,6,7,8,9,10-hexahydrocycloocta[d]pyrimidin-2,4-diol and 300 ml. of phosphorus oxychloride are mixed and refluxed for 4 hours. The phosphorus oxychloride is removed on the steam bath under reduced pressure. The residue is added to crushed ice. The solid is filtered and dried to give 30.5 g. product melting between 82–83°. It is recrystallized from 300 ml. of hexane to give 26.5 g. (82%) of material melting between 82–83° C.

(c) *2,4 - bis[2 - diethylaminoethylamino] - 5,6,7,8,9,10-hexahydrocycloocta[d]pyrimidine, salt with three moles of oxalic acid.*—Five grams of 2,4-dichloro-5,6,7,8,9,10-hexahydrocycloocta[d]pyrimidine and 50 g. diethylaminoethylamine are reacted as described in Example 3. There is obtained 6.5 g. (46%) of material melting between 152–154° C.

EXAMPLE 10

*2,4 - bis[2 - ethylaminoethoxy] - 5,6,7,8,9,10 - hexahydrocycloocta[d]pyrimidine, salt with two moles of oxalic acid*

To a solution of 0.90 g. of sodium in 50 ml. of N-ethylaminoethanol is added 4.6 g. of 2,4-dichloro-5,6,7,8,9,10-hexahydrocycloocta[d]pyrimidine. The solution is heated 4 hours at 100° C. The excess N-ethylaminoethanol is removed under reduced pressure. The residue is diluted with 200 ml. of water and extracted with 2 x 200 ml. of ether. The ether layers are combined and washed with 5 x 50 ml. of water and dried over magnesium sulfate. To the filtered solution is added 2 g. of oxalic acid dissolved in 10 ml. of ethanol. The precipitate is collected and recrystallized from 80 ml. of isopropanol to give 3.1 g. (28%) of material melting between 142–144° C.

EXAMPLE 11

*5,6,7,8,9,10-hexahydrocycloocta[d]pyrimidine-2,4-dithiol*

A mixture of 6 g. of 2,4-dichloro-5,6,7,8,9,10-hexahydrocycloocta[d]pyrimidine and 30 g. of sodium hydrosulfide in 50 ml. of absolute ethanol is refluxed for 3 hours, cooled and diluted with 50 ml. of water. The product is collected and recrystallized from 250 ml. of 95% ethanol to give 1.2 g. (20%) of material melting between 284–286° C.

EXAMPLE 12

*4 - (3 - dimethylaminopropylamino) - 5,6,7,8,9,10 - hexahydrocycloocta[d]pyrimidine, salt with two moles of oxalic acid, hydrate*

(a) *2 - mercapto - 5,6,7,8,9,10-hexahydrocycloocta[d]-pyrimidin-4-ol.*—8.1 g. of sodium is added to 220 ml. of absolute ethanol. To this solution is added with stirring 70 g. of ethyl 2-keto cyclooctylcarboxylate and 35 g. of thiourea. The mixture is refluxed for 6 hours. After cooling, the mixture is poured onto ice and acidified with hydrochloric acid. The solid is collected and recrystallized from 250 ml. of 95% ethanol to give 23 g. (57%) of material melting between 249–250° C.

(b) *5,6,7,8,9,10 - hexahydrocycloocta[d]pyrimidin - 4-ol.*—A mixture of 23 g. 2-mercapto-5,6,7,8,9,10-hexahydrocycloocta[d]pyrimidin-4-ol and 230 g. Raney nickel in 1 liter absolute ethanol is refluxed for 5 hours and filtered. The filtrate is evaporated to dryness and then recrystallized from 300 ml. 70% ethanol to give 11.5 g. (57%) of material melting between 194–195° C.

(c) *4-chloro-5,6,7,8,9,10-hexahydrocycloocta[d]pyrimidine.*—A mixture of 11 g. of 5,6,7,8,9,10-hexahydrocycloocta[d]pyrimidin-4-ol and 55 ml. of phosphorus oxychloride is refluxed for two hours, cooled and is poured onto 500 g. of ice. The solution is adjusted to ca. pH 5 with ammonium hydroxide. The oil is extracted with 300 ml. of ether and the extract is dried over magnesium sulfate. The ether is removed and the residue distilled to give 11.5 g. (94%) of material distilling between 145–147°/10 mm.

(d) *4-(3-dimethylaminopropylamino)-5,6,7,8,9,10-hexahydrocycloocta[d]pyrimidine, salt with two moles of oxalic acid, hydrate.*—Four and one-half grams of 4-chloro-5,6,7,8,9,10-hexahydrocycloocta[d]pyrimidine and 30 g. of 3-dimethylaminopropylamine are reacted as described in Example 3. The crude product is recrystallized from 50 ml. of a methanol-ether solution to give 4.8 g. (46%) of material melting between 110–112° C.

EXAMPLE 13

*4 - amino - 2 - (3-dimethylaminopropylamino)-5,6,7,8,9,10-hexahydrocycloocta[d]pyrimidine, salt with two moles of oxalic acid, compound with one mole ethanol*

(a) *5,6,7,8,9,10-hexahydro-2-(methylthio)cycloocta[d]-pyrimidin-4-ol.*—A solution of 16 g. of 2-mercapto-5,6,7,8,9,10-hexahydrocycloocta[d]pyrimidin-4-ol in 240 ml. of N sodium hydroxide solution is treated with 11.0 g. of methyl iodide and stirred at room temperature for 4 hours. The solution is acidified with acetic acid. The product is collected and dried to give 16.5 g. (97%) of material melting between 215–217° C.

(b) *2 - (3 - dimethylaminopropylamino)-5,6,7,8,9,10-hexahydrocycloocta[d]pyrimidin-4-ol.*—A mixture of 16.5 g. of 5,6,7,8,9,10-hexahydro-2-(methylthio)cycloocta[d]pyrimidine-4-ol and 15.3 g. of 3-dimethylaminopropylamine are heated at 160° for 4 hours. The mixture is cooled and triturated with 100 ml. of hexane and the product filtered. Upon recrystallization from 200 ml. of hexane there is obtained 14 g. (68%) of material melting between 107–109° C.

(c) *4 - chloro - 2 - (3 - dimethylaminopropylamino)-5,6,7,8,9,10 - hexahydrocycloocta[d]pyrimidine.*—Eleven grams of 2-(3-dimethylaminopropylamino)-5,6,7,8,9,10-hexahydrocycloocta[d]pyrimidine and 30 ml. of phosphorus oxychloride are reacted as in Example 1(b) to give 9 g. of a syrupy compound.

(d) *4 - amino - 2 - (3 - dimethylaminopropylamino)-5,6,7,8,9,10-hexahydrocycloocta[d]pyrimidine, salt with two moles of oxalic acid, compound with one mole of ethanol.*—Nine grams of 4-chloro-2-(dimethylaminopropylamino) - 5,6,7,8,9,10 - hexahydrocycloocta[d]pyrimidine is heated with 100 ml. of 3.5 N alcoholic ammonia in a sealed tube at 155° for 20 hours. The tube is cooled and the contents poured onto a dish to allow the ammonia and alcohol to evaporate. The residue is taken up in 25 ml. of water and made alkaline with excess potassium carbonate. The mixture is extracted with ether. The ether extract is dried and upon removal of the solvent there is obtained 8.2 g. of base. This product is dissolved in 25 ml. of absolute ethanol and added to a solution of 7 g. of oxalic acid in 25 ml. of ethanol. The product is collected and recrystallized from 55 ml. of absolute ethanol to give 7.0 g. (46%) of material melting between 148–150° C.

EXAMPLE 14

*2 - amino - 5,6,7,8,9,10 - hexahydro - 4[2 - hexahydro-1-azepinyl)ethylamino]cycloocta[d]pyrimidine, salt with two moles of oxalic acid*

Three grams of 2-amino-4-chloro-5,6,7,8,9,10-hexahydrocycloocta[d]pyrimidine and 20 g. of 1-(2-aminoethyl)hexamethyleneimine are reacted as in Example 3. The crude oxalate when recrystallized from an ethanol-ether mixture gives a crystalline material.

What is claimed is:

1. A compound of the formula

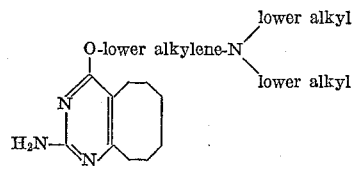

2. A compound of the formula

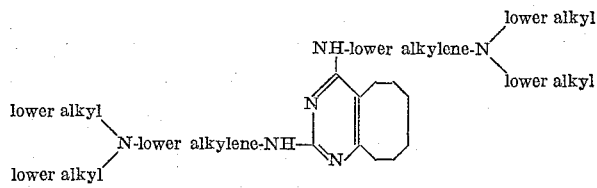

3. A compound selected from the group consisting of bases of the formula

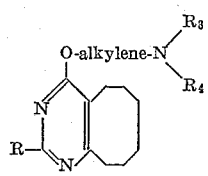

wherein R is a member of the group consisting of amino,

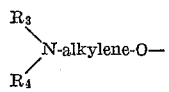

$R_3$ and $R_4$ each is a member of the group consisting of hydrogen, lower alkyl, hydroxy-lower alkyl, phenyl-lower alkyl and, together with the nitrogen to which they are attached a member of the group consisting of piperidino, (lower alkyl)piperidino, di(lower alkyl)piperidino, (lower alkoxy)piperidino, pyrrolidino, (lower alkyl)pyrrolidino, di(lower alkyl)pyrrolidino, (lower alkoxy)pyrrolidino, morpholino, (lower alkyl)morpholino, di(lower alkyl)morpholino, (lower alkoxy)morpholino, thiamorpholino, (lower alkyl)thiamorpholino, di(lower alkyl)thiamorpholino, (lower alkoxy)thiamorpholino, piperazino, (lower alkyl)piperazino, di(lower alkyl)piperazino and hexamethyleneimino, and alkylene has up to about twelve carbon atoms and acid-addition salts of said bases.

4. A compound of the formula

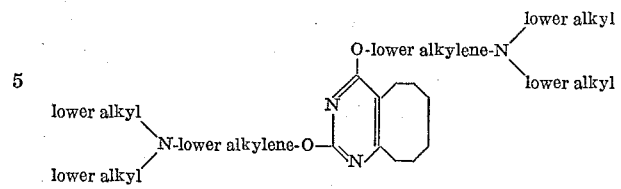

5. 2-amino - 4 - (2-diethylaminoethoxy)-5,6,7,8,9,10-hexahydrocycloocta[d]pyrimidine.

6. 2,4 - bis[2 - ethylaminoethoxy] - 5,6,7,8,9,10-hexahydrocycloocta[d]pyrimidine.

7. A compound selected from the group consisting of bases of the formula

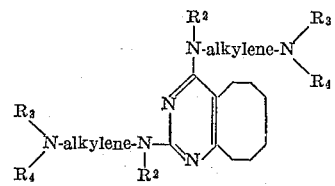

wherein $R^2$ is a member of the group consisting of hydrogen and lower alkyl, $R_3$ and $R_4$ each is a member of the group consisting of hydrogen, lower alkyl, hydroxy-lower alkyl, phenyl-lower alkyl and together with the nitrogen to which they are attached a member of the group consisting of piperidino, (lower alkyl)piperidino, di(lower alkyl)piperidino, (lower alkoxy)piperidino, pyrrolidino, (lower alkyl)pyrrolidino, di(lower alkyl)pyrrolidino, (lower alkoxy)pyrrolidino, morpholino, (lower alkyl)morpholino, di(lower alkyl)morpholino, (lower alkoxy)morpholino, thiamorpholino, (lower alkyl)thiamorpholino, di(lower alkyl)thiamorpholino, (lower alkoxy)thiamorpholino, piperazino, (lower alkyl)piperazino, di(lower alkyl)piperazino and hexamethylamino, and alkylene has up to about twelve carbon atoms and acid-addition salts of said bases.

8. 2,4-bis[2 - diethylaminoethylamino] - 5,6,7,8,9,10-hexahydrocycloocta[d]pyrimidine.

References Cited by the Examiner

UNITED STATES PATENTS

| | | | |
|---|---|---|---|
| 2,517,824 | 8/50 | Appelquest | 260—256.4 |
| 2,949,466 | 8/60 | Hoefle et al. | 260—247.2 |

FOREIGN PATENTS 583,815  12/46  Great Britain.

OTHER REFERENCES

Curd et al.: J. Chem. Soc., London (1946), pages 381–3.

Fieser: Organic Chemistry, Third Edition (1956), pages 46–7.

Hull et al: J. Chem. Soc., London (1946), pages 359–62.

NICHOLAS S. RIZZO, *Primary Examiner.*

UNITED STATES PATENT OFFICE
CERTIFICATE OF CORRECTION

Patent No. 3,185,691                                            May 25, 1965

Edward Joseph Pribyl et al.

It is hereby certified that error appears in the above numbered patent requiring correction and that the said Letters Patent should read as corrected below.

Column 7, line 41, after "amino," insert -- hydrogen, hydroxy, thiol, halogen, lower alkoxy and --.

Signed and sealed this 23rd day of November 1965.

(SEAL)
Attest:

ERNEST W. SWIDER                                     EDWARD J. BRENNER
Attesting Officer                                          Commissioner of Patents